United States Patent
Shepherd et al.

(10) Patent No.: US 8,770,685 B2
(45) Date of Patent: Jul. 8, 2014

(54) LOGICAL AND VIRTUAL NOZZLE-FIRE-RESTART-LINE FOR FLUID-EJECTION DEVICE

(75) Inventors: Matthew A. Shepherd, Vancouver, WA (US); Walter D. Clark, Vancouver, WA (US); Trudy Benjamin, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 168 days.

(21) Appl. No.: 13/201,460

(22) PCT Filed: Feb. 22, 2009

(86) PCT No.: PCT/US2009/034806
§ 371 (c)(1),
(2), (4) Date: Aug. 14, 2011

(87) PCT Pub. No.: WO2010/096059
PCT Pub. Date: Aug. 26, 2010

(65) Prior Publication Data
US 2011/0316917 A1    Dec. 29, 2011

(51) Int. Cl.
*B41J 29/38* (2006.01)

(52) U.S. Cl.
USPC .................................. 347/5; 347/9; 347/4

(58) Field of Classification Search
USPC ................................... 347/5, 9, 4
See application file for complete search history.

(56) References Cited

U.S. PATENT DOCUMENTS

| 6,578,940 B2 * | 6/2003 | Rehmann et al. ............... 347/5 |
| 7,007,120 B2 | 2/2006 | Spencer et al. |
| 7,379,463 B2 | 5/2008 | Tomita |
| 7,408,960 B1 | 8/2008 | Higashida |
| 2006/0062244 A1 | 3/2006 | Oksman |
| 2007/0033141 A1 | 2/2007 | Higurashi |
| 2007/0147385 A1 | 6/2007 | Druke et al. |
| 2008/0043862 A1 | 2/2008 | Yajima |
| 2008/0151942 A1 | 6/2008 | Lee et al. |

FOREIGN PATENT DOCUMENTS

| CN | 1550973 A | 12/2004 |
| EP | 1046164 B1 | 5/2005 |
| EP | 1453239 B1 | 8/2005 |
| GN | 101291811 A | 10/2008 |
| WO | WO-2005/076961 A3 | 8/2005 |
| WO | WO-2007/028719 A1 | 3/2007 |
| WO | WO-2008/140260 A1 | 11/2008 |

* cited by examiner

*Primary Examiner* — Lam S Nguyen

(57) ABSTRACT

A fluid-ejection device includes physical data lines, a controller, and a fluid-ejection mechanism. The physical data lines communicatively connect the controller and the fluid-ejection mechanism. The controller is to assert a logical and virtual nozzle-fire-restart line to denote that a first data sub-packet of a new data packet of nozzle data for a predetermined sequence of fluid-ejection nozzles of the fluid-ejection mechanism is being transmitted over the physical data lines. The fluid-ejection mechanism is to listen for the controller to assert the logical and virtual nozzle-fire-restart line, to discern that the first data sub-packet of the new data packet is being transmitted over the physical data lines.

15 Claims, 4 Drawing Sheets

LOGICAL AND VIRTUAL NOZZLE-FIRE-RESTART-LINE FOR FLUID-EJECTION DEVICE

BACKGROUND

Fluid-ejection devices include inkjet-printing devices that are commonly employed to form images on media like paper using ink. In many types of fluid-ejection devices, a number of fluid-ejection nozzles of a fluid-ejection mechanism eject fluid onto a current swath of media incident to the mechanism, with the mechanism remaining stationary or while the mechanism moves across the current swath. The media is then typically moved so that the fluid-ejection mechanism is incident to the next swath of media, and the fluid-ejection nozzles of the mechanism eject fluid on this new swath. This process is repeated until the entirety of the media has had fluid ejected thereon as desired.

DETAILED DESCRIPTION

As noted in the background section, a fluid-ejection mechanism ejects fluid onto a current swath of media in accordance with nozzle data, which may correspond to an image to be formed on the media. The nozzle data indicates which of the fluid-ejection nozzles of the fluid-ejection mechanism should eject fluid onto the current swath of media. A controller may provide the nozzle data to the fluid-ejection mechanism over physical data lines. The fluid-ejection mechanism thus receives this nozzle data, and ejects fluid in accordance with the nozzle data, either as the mechanism remains stationary or while the mechanism moves across the current swath.

The fluid-ejection nozzles of a fluid-ejection mechanism may be ordered in a predetermined sequence. The controller may send nozzle data for the fluid-ejection nozzles to the fluid-ejection mechanism in the predetermined sequence of the nozzles. In some situations, to signal to the fluid-ejection mechanism that the controller is about to begin sending nozzle data for the fluid-ejection nozzles thereof in this predetermined sequence—starting with the nozzle data for the first nozzle in this sequence—the controller may first assert a physical nozzle-fire-restart line immediately prior to transmitting the nozzle data over the physical data lines. In other situations, the nozzle data may be sent prior to assertion of the physical nozzle-fire-restart line, particularly where the nozzle data is buffered by the fluid-ejection mechanism. In these latter situations, the controller asserts the physical nozzle-fire-restart line after the start of the nozzle data has been sent.

The inclusion of a physical nozzle-fire-restart line adds to the manufacturing cost of a fluid-ejection device, which can be disadvantageous because the marketplace for fluid-ejection devices like inkjet printers is cost-sensitive for low-end consumer inkjet printers in particular. The inventors have innovatively eliminated the need for adding a physical nozzle-fire-restart line to a fluid-ejection device, while retaining the functionality of such a nozzle-fire-restart line. This is achieved by employing a logical and virtual nozzle-fire-restart line in lieu of a physical nozzle-fire-restart line. As such, fluid-ejection devices that would ordinarily employ a physical nozzle-fire-restart line can be produced less inexpensively by employing embodiments of the present disclosure, which is advantageous. Furthermore, as described in more detail below, using a logical and virtual nozzle-fire-restart line can increase the functionality of a fluid-ejection device as compared to one that just includes a physical nozzle-fire-restart line.

Figure 1A:
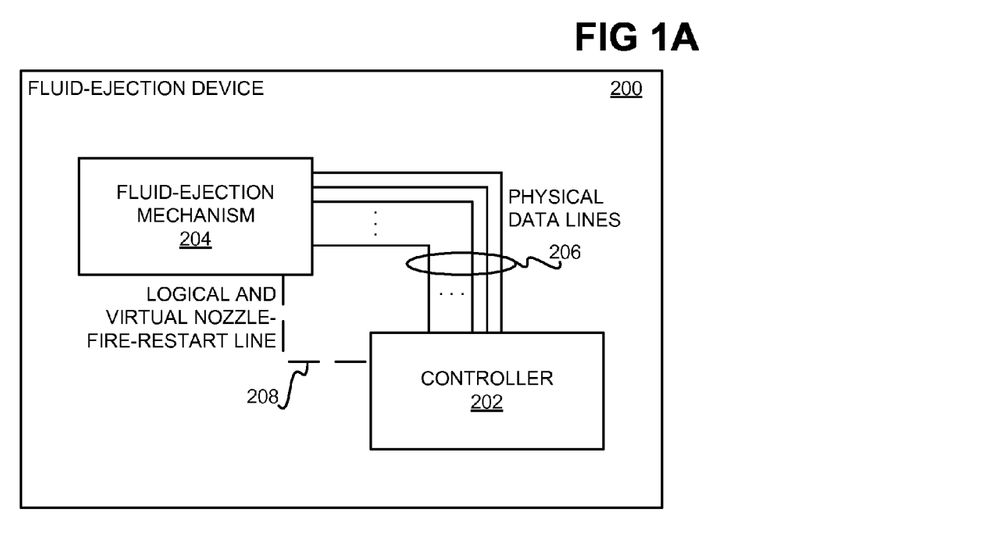
FIG. 1A is a block diagram of a fluid-ejection device, according to an embodiment of the present disclosure.

FIG. 2 shows a rudimentary fluid-ejection device 200, according to an embodiment of the present disclosure. The fluid-ejection device 200 includes a controller 202 and a fluid-ejection mechanism 204 communicatively connected to one another via a number of physical data lines 206 and a logical and virtual nozzle-fire-restart line 208. The data lines 206 are physical in the sense that they are actual and real conductive traces that electrically and directly connect the controller 202 and the fluid-ejection mechanism 204. By comparison, the nozzle-fire-restart line 208 is logical and virtual in the sense that it is not an actual and real conductive trace that electrically and directly connects the controller 202 and the fluid-ejection mechanism 204. A specific embodiment as to how such a logical and virtual nozzle-fire-restart line 208 can be implemented is described later in the detailed description.

As noted above, upon the fluid-ejection mechanism 204 being incident to a current swath of media, it ejects fluid in accordance with nozzle data, which may correspond to an image to be formed on the media. The controller 202 provides the nozzle data to the fluid-ejection mechanism 204 over the physical data lines 206. The fluid-ejection mechanism 204 thus receives this nozzle data, and ejects fluid in accordance with the nozzle data. The fluid-ejection mechanism 204 specifically has a number of fluid-ejection nozzles through which the fluid is actually ejected.

The fluid-ejection nozzles of the fluid-ejection mechanism 204 are ordered in a predetermined sequence. The controller 202 sends the nozzle data for the fluid-ejection nozzles of the fluid-ejection mechanism 204 to the mechanism 204 in the predetermined sequence of the nozzles, within a data packet that is made up of a number of data sub-packets. To signal to the fluid-ejection mechanism 204 that the controller 202 is sending nozzle data for the fluid-ejection nozzles thereof in this predetermined sequence—starting with the nozzle data for the first nozzle in this sequence—the controller 202 asserts the logical and virtual nozzle-fire-restart line 208 immediately prior to or immediately after transmitting the nozzle data over the physical data lines 206. That is, the controller 202 signals to the fluid-ejection mechanism 204 that the data sub-packet being sent is the start of a new data packet by asserting the logical and virtual nozzle-fire-restart line 208 with the transmission of the first data sub-packet of a new data packet.

Figure 1B:
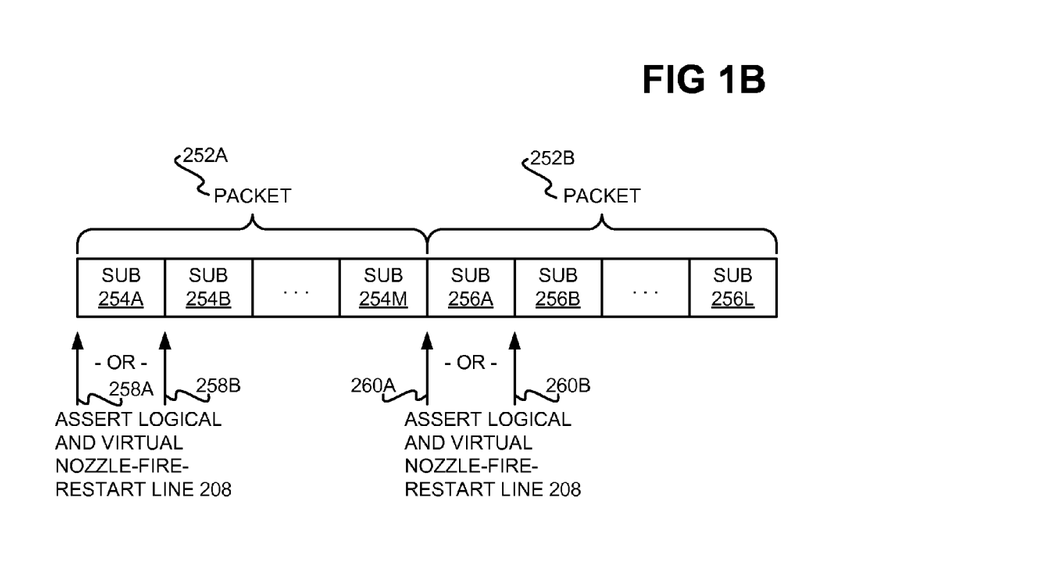
FIG. 1B is a diagram depicting how nozzle data is transmitted over a number of data packets having data sub-packets, according to an embodiment of the present disclosure.

For instance, FIG. 1B shows how the nozzle data is sent from the controller 202 to the fluid-ejection mechanism 204 over a number of representative data packets 252A and 252B, collectively referred to as the data packets 252. The data packet 252A includes the data sub-packets 254A, 254B, . . . , 254M, collectively referred to as the data sub-packets 254. The data packet 252B includes the data sub-packets 256A, 256B, . . . , 256L, collectively referred to as the data sub-packets 256. Each of the data packets 252 may encompass the nozzle data for one or more logical groups of the fluid-ejection nozzles of the fluid-ejection mechanism 204 in the predetermined sequence. Each of the data sub-packets 254 and 256 may thus encompass the nozzle data for a portion or sub-group of the fluid-ejection nozzles within these logical groups.

It is noted that in FIG. 1B, there is no easy way to distinguish which data sub-packets 254 and 256 belong to which data packets 252. That is, the data sub-packets 254 and 256 are sent in sequence from the controller 202 to the fluid-ejection mechanism 204. As such, the fluid-ejection mechanism 204 may not be able to discern which of the data sub-packets 254 and 256 corresponds to the start of a new data packet, and thus to the beginning of the predetermined sequence of fluid-ejection nozzles.

Therefore, the controller 202 asserts the logical and virtual nozzle-fire-restart line 208 just before or as it begins to transmit the sub-packet 254A as indicated by the arrow 258A, or just after it has finished or as it finishes transmitting the sub-packet 254A as indicated by the arrow 258B, to indicate that the sub-packet 254A is the first sub-packet of a new data packet, particularly the data packet 252A. Likewise, the controller 202 asserts the logical and virtual nozzle-fire-restart line 208 just before or as it begins to transmit the sub-packet 256A as indicated by the arrow 260A, or just after it has finished transmitting or as it finishes transmitting the sub-packet 256A as indicated by the arrow 260B, to indicate that the sub-packet 256A is the first sub-packet of a new data packet, particularly the data packet 252B. In this way, the fluid-ejection mechanism 204 is able to discern when the controller 202 has started sending the new data packets 252.

It is said that the controller 202 asserts the logical and virtual nozzle-fire-restart line 208 when the controller 202 is transmitting the first data sub-packet (e.g., the sub-packet 254A or the sub-packet 256A) of a new data packet (e.g., the packet 252A or the packet 252B). This language is intended to encompass the controller 202 asserting the logical and virtual nozzle-fire-restart line 208 immediately before the controller 202 transmits the first data sub-packet of a new data packet, or in synchronization with the controller 202 starting to send the first data sub-packet of a new data packet. This language is also intended to encompass the controller 202 asserting the logical and virtual nozzle-fire-restart line 208 immediately after the controller 202 has transmitted the first data sub-packet of a new data packet, or in synchronization with the controller 202 finishing sending the first data sub-packet of a new data packet.

The logical and virtual nozzle-fire-restart line 208 is referred to as a nozzle-fire-restart line because the line 208 is asserted when the controller 202 is starting to transmit nozzle data for the firing of the fluid-ejection nozzles of the fluid-ejection mechanism 204 in the predetermined sequence within a new data packet. The term "restart" is used because over the course of fluid ejection by the fluid-ejection nozzles of the fluid-ejection mechanism 204, the predetermined sequence of the nozzles is typically repeated multiple times, and hence the firing of these nozzles in the predetermined sequence is "restarted" a number of times. The fluid-ejection mechanism 204 listens to the logical and virtual nozzle-fire-restart line 208, and when the logical and virtual nozzle-fire-restart line 208 has been asserted, the mechanism 204 knows that the nozzle data being sent over the physical data lines 206 corresponds to the nozzle data for the first fluid-ejection nozzle in this sequence. That is, when the logical and virtual nozzle-fire-restart line 208 has been asserted, the fluid-ejection mechanism 204 knows that the data sub-packet about to be transmitted or that has been most recently transmitted is the first sub-packet of a new data packet corresponding to the nozzle data for the fluid-ejection nozzles in the predetermined sequence.

An inventive insight contributed by the inventors is that the functionality of a physical nozzle-fire-restart line can instead be assumed by a logical and virtual nozzle-fire-restart line 208 that replicates the functionality of the physical nozzle-fire-restart line, without requiring an actual and real conductive trace for the nozzle-fire-restart line. Besides reducing the manufacturing cost of the fluid-ejection device 200 as compared to the fluid-ejection device 100, the substitution of the logical and virtual nozzle-fire-restart line 208 for a physical nozzle-fire-restart line is advantageous in other ways as well. For example, where there is more than one fluid-ejection mechanism within a fluid-ejection device, essentially the only way to provide for asynchronous fluid ejection by these multiple mechanisms is to have a separate physical nozzle-fire-restart line for each fluid-ejection mechanism, which can be impractical if not impossible.

However, there is no corresponding impracticality or impossibility with having a separate logical and virtual nozzle-fire-restart line for each of a number of fluid-ejection mechanisms, because these inventive logical and virtual nozzle-fire-restart lines in actuality do not physically exist. As such, as many logical and virtual nozzle-fire-restart lines as needed or as desired can be included, without concern for the available space within the fluid-ejection device as is the case when adding physical nozzle-fire-restart lines. Therefore, for instance, asynchronous fluid ejection by multiple fluid-ejection mechanism to achieve increased printing resolution (i.e., increased fluid ejection resolution) is easily provided by embodiments of the present disclosure. Thus, using a logical and virtual nozzle-fire-restart line increases the functionality of a fluid-ejection device having, as compared to one that just includes a physical nozzle-fire-restart line.

Implementation details for a fluid-ejection device having a logical and virtual nozzle-fire-restart line are now presented. Such implementation details provide for the advantages associated with having a logical and virtual nozzle-fire-restart line outlined above. The detailed description concludes with a description of a fluid-ejection device having multiple fluid-ejection mechanism and one or multiple logical and virtual nozzle-fire-restart lines.

Figure 2:
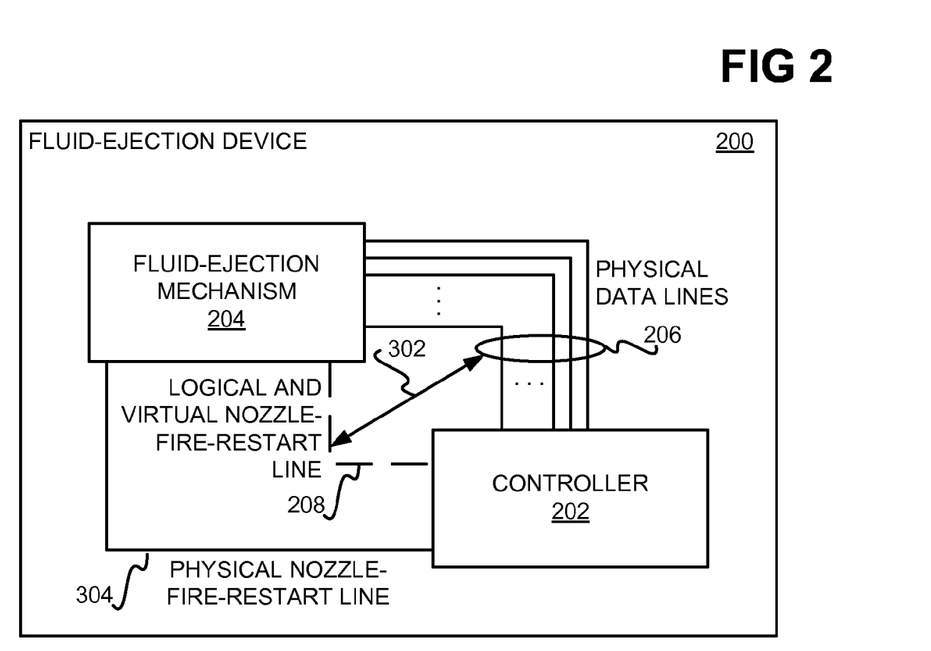
FIG. 2 is a block diagram of a fluid-ejection device, according to another embodiment of the present disclosure.

FIG. 2 shows the fluid-ejection device 200, according to another embodiment of the present disclosure. The fluid-ejection device 200 may be an inkjet-printing device, which is a device, such as a printer, that ejects ink onto media, such as paper, to form images, which can include text, on the media. The fluid-ejection device 200 is more generally a fluid-ejection precision-dispensing device that precisely dispenses fluid, such as ink. The fluid-ejection device 200 may eject pigment-based ink, dye-based ink, another type of ink, or another type of fluid. Embodiments of the present disclosure can thus pertain to any type of fluid-ejection precision-dispensing device that dispenses a substantially liquid fluid.

A fluid-ejection precision-dispensing device is therefore a drop-on-demand device in which printing, or dispensing, of the substantially liquid fluid in question is achieved by precisely printing or dispensing in accurately specified locations, with or without making a particular image on that which is being printed or dispensed on. As such, a fluid-ejection precision-dispensing device is in comparison to a continuous precision-dispensing device, in which a substantially liquid fluid is continuously dispensed therefrom. An example of a continuous precision-dispensing device is a continuous inkjet-printing device.

The fluid-ejection precision-dispensing device precisely prints or dispenses a substantially liquid fluid in that the latter is not substantially or primarily composed of gases such as air. Examples of such substantially liquid fluids include inks in the case of inkjet-printing devices. Other examples of substantially liquid fluids include drugs, cellular products, organisms, fuel, and so on, which are not substantially or primarily composed of gases such as air and other types of gases, as can be appreciated by those of ordinary skill within the art.

As in FIG. 1A, the fluid-ejection device 200 of FIG. 2 includes a controller 202 and a fluid-ejection mechanism 204. The controller 202 includes hardware, such as an application-specific integrated circuit (ASIC), that controls the ejection of fluid from the fluid-ejection mechanism 204. The fluid-ejection mechanism 204 may be a fluid-ejection printhead, such as an inkjet printhead, and may also be referred to as a fluid-ejection pen, such as an inkjet pen. The fluid-ejection mechanism 204 may further be or include a fluid-ejection printhead die, such as an inkjet printhead die. The controller 202 is not disposed on and is not part of the fluid-ejection mechanism 204, but rather is separate from the mechanism 204, and is communicatively connected to the mechanism 204 by the physical data lines 206.

FIG. 2 shows how the logical and virtual nozzle-fire-restart line 208 is implemented in one embodiment, as illustratively depicted by the arrow 302. In particular, the logical and virtual nozzle-fire-restart line 208 is implemented via the physical data lines 206 in the embodiment of FIG. 2. The controller 202 transmits one or more predetermined nozzle-fire-restart bits over the physical data lines 206 when transmitting the nozzle data over the physical data lines 206 starting with the fluid-ejection nozzle at the beginning of the predetermined sequence of the nozzles of the fluid-ejection mechanism 204. That is, the controller 202 transmits the predetermined nozzle-fire-restart bits when transmitting the first data sub-packet of a new data packet of the nozzle data (for instance, as part of and within the first data sub-packet). The transmission of the nozzle-fire-restart bits over the physical data lines 206 corresponds to the assertion of the logical and virtual nozzle-fire-restart line 208. In this way, the embodiment of FIG. 2 leverages the physical data lines 206 to also implement the logical and virtual nozzle-fire-restart line 208, instead of having to include a separate physical nozzle-fire-restart line.

The fluid-ejection mechanism 204 listens to the physical data lines 206 for the predetermined nozzle-fire-restart bits corresponding to the controller 202 asserting the logical and virtual nozzle-fire-restart line 208, to discern that the nozzle data being transmitted over the physical data lines 206 is for the beginning of the predetermined sequence of the fluid-ejection nozzles of the mechanism 204. That is, the fluid-ejection mechanism 204 listens to the physical data lines 206 for the predetermined nozzle-fire-restart bits to discern that the data sub-packet being transmitted over physical data lines 206 is the first data sub-packet of a new data packet, as has been described in relation to FIG. 1B above. In this way, the physical data lines 206 are employed for a purpose—the assertion of the logical and virtual nozzle-fire-restart line 208—that is different than their intended purpose, which is the delivery of nozzle data to the fluid-ejection mechanism 204 from the controller 202. As such, there is no need to include a separate physical nozzle-fire-restart line. The logical and virtual nozzle-fire-restart line 208 is asserted in lieu of a physical nozzle-fire-restart line being asserted, prior to transmission of the nozzle data over the physical data lines 206.

However, FIG. 2 nevertheless depicts that in one embodiment, the fluid-ejection device 200 may also include a physical nozzle-fire-restart line 304, in addition to implementing the logical and virtual nozzle-fire-restart line 208 over the physical data lines 206 as indicated by the arrow 302. The physical nozzle-fire-restart line 304 communicatively connects the fluid-ejection mechanism 204 to the controller 202. The inclusion of the physical nozzle-fire-restart line 304 may be desirable for compatibility purposes. For instance, during the transition of programming fluid-ejection devices from employing a physical nozzle-fire-restart line to employing a logical and virtual nozzle-fire-restart line, the inclusion of both the physical nozzle-fire-restart line 304 and the logical and virtual nozzle-fire-restart line 208 permits the controller 202 and the fluid-ejection mechanism 204 to be programmed to use either the physical line 304 or the logical and virtual line 208.

In some embodiments, then, the fluid-ejection device 200 may still include the physical nozzle-fire-restart line 304 in addition to the logical and virtual nozzle-fire-restart line 208, whereas in other embodiments, the fluid-ejection device 200 may not include the physical nozzle-fire-restart line 304 and may just include the logical and virtual nozzle-fire-restart line 208. In the former embodiment, the physical nozzle-fire-restart line 304 may be asserted to signal that nozzle data beginning with the nozzle data for the first fluid-ejection nozzle of the predetermined sequence of fluid-ejection nozzles is being transmitted over the physical data lines 206 (i.e., that the data sub-packet being transmitted is the first sub-packet of a new data packet). In either the former embodiment or the latter embodiment, the logical and virtual nozzle-fire-restart line 208 may be asserted to signal that nozzle data is being transmitted over the physical data lines 206 (i.e., that the data sub-packet being transmitted is the first sub-packet of a new data packet).

Figure 3:
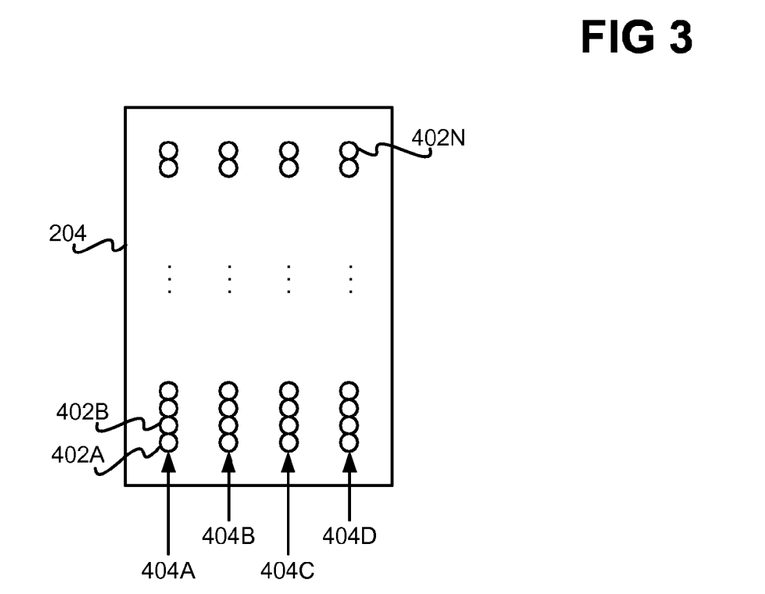
FIG. 3 is a diagram depicting the underside of a fluid-ejection mechanism of a fluid-ejection device in detail, according to an embodiment of the disclosure.

FIG. 3 shows the underside of the fluid-ejection mechanism 204 in detail, according to an embodiment of the present disclosure. The surface of the fluid-ejection mechanism 204 depicted in FIG. 3 is the surface that is incident to media, such as paper, onto which the mechanism 204 is to eject fluid, such as ink. The fluid-ejection mechanism 204 includes a number of fluid-ejection nozzles 402A, 402B, . . . , 402N, collectively referred to as the fluid-ejection nozzles 402. In the embodiment of FIG. 3, the fluid-ejection nozzles 402 are organized in four columns 404A, 404B, 404C, and 404D, collectively referred to as the columns 404. However, there may be as few as one column 404, and there may be more than four columns 404 in varying embodiments. In one embodiment, there are 120 fluid-ejection nozzles 402 in each of the four columns 404, for a total of 480 nozzles 402.

The controller 202 provides nozzle data to the mechanism 204 to indicate which of the fluid-ejection nozzles 402 should eject fluid therefrom in relation to the current position of the mechanism 204 incident to a current swath of media. The four columns 404 of the fluid-ejection nozzles 402 may correspond to the four colors cyan, magenta, yellow, and black, for instance, to permit full-color printing by the fluid-ejection device 200 where the device 200 is specifically an inkjet-printing device. As noted above, the fluid-ejection nozzles 402 may be organized in a predetermined sequence, such that the nozzle data for the nozzles 402 is sent in a data packet that is divided over a number of data sub-packets.

Therefore, the logical and virtual nozzle-fire-restart line 208, or the physical nozzle-fire-restart line 304, is asserted to indicate that the controller 202 is transmitting nozzle data corresponding to the fluid-ejection nozzles 402 as ordered in this predetermined sequence, starting with the first data sub-packet of a new data packet. As one example, the fluid-ejection nozzles 402 may be ordered in a predetermined sequence from the first nozzle 402A to the last nozzle 402N. In some embodiments, the logical and virtual nozzle-fire-restart line 208 and the physical nozzle-fire-restart line 304 may be considered column-synchronization lines, which in shorthand may be referred to as "csync" lines.

The predetermined nozzle-fire-restart bits that are transmitted by the controller 202 over the physical data lines 206 to indicate or denote assertion of the logical and virtual nozzle-fire-restart line 208 may include one or more bits. For instance, in one embodiment, the predetermined nozzle-fire-restart bits may have multiple bits in a predetermined pattern. The fluid-ejection mechanism 204 thus listens to the physical data lines 206 for this pattern to discern when the nozzle data for the fluid-ejection nozzles 402 is being sent over the physical data lines 206 in the predetermined sequence starting with the first data sub-packet of a new data packet. The predetermined nozzle-fire-restart bits may be included within the first data sub-packet of a new data packet in such an embodiment. When the fluid-ejection mechanism 204 has detected the predetermined pattern of nozzle-fire-restart bits within a data sub-packet, it knows that this data sub-packet is the start of a data packet within which the nozzle data for the fluid-ejection nozzles 402 is being transmitted in the predetermined sequence.

The nozzle data transmitted from the controller 202 to the fluid-ejection mechanism 204 over the physical data lines 206 indicates, for the predetermined sequence of the fluid-ejection nozzles 402, which of the nozzles 402 are to eject fluid. That is, the nozzle data controls how fluid is to be ejected from the fluid-ejection mechanism 204 such that, for instance, the fluid is ejected from the fluid-ejection nozzles 402 in accordance with the nozzle data. For example, in a very simple embodiment, the nozzle data may consist of a series of bits corresponding in number and in order to the fluid-ejection nozzles 402 of a given column. If the bit for a given fluid-ejection nozzle is zero, then the fluid-ejection mechanism 204 does not cause this nozzle to eject fluid, whereas if the bit is one, then the mechanism 204 does cause this nozzle to eject fluid. It is noted that the nozzle data can correspond to at least a portion of an image to be formed on a medium like paper, resulting from the fluid, such as ink, ejected by the fluid-ejection mechanism 204 onto the medium.

The fluid-ejection nozzles 402 within the predetermined sequence may be divided into separate logical nozzle groups, which may or may not correspond to the columns 404. Each data packet may correspond to one or more of these logical nozzle groups. In such instance, the first data sub-packet of a data packet includes the nozzle-fire-restart bits that signal the (re)start of the transmission of nozzle data for the fluid-ejection nozzles 402 in the predetermined sequence. In at least some embodiments, the predetermined sequence of the fluid-ejection nozzles 402 of the fluid-ejection mechanism 204 includes all the nozzles 402 of the mechanism 204, where the nozzles 402 may be further divided or organized into additional nozzle groups.

Figure 4:
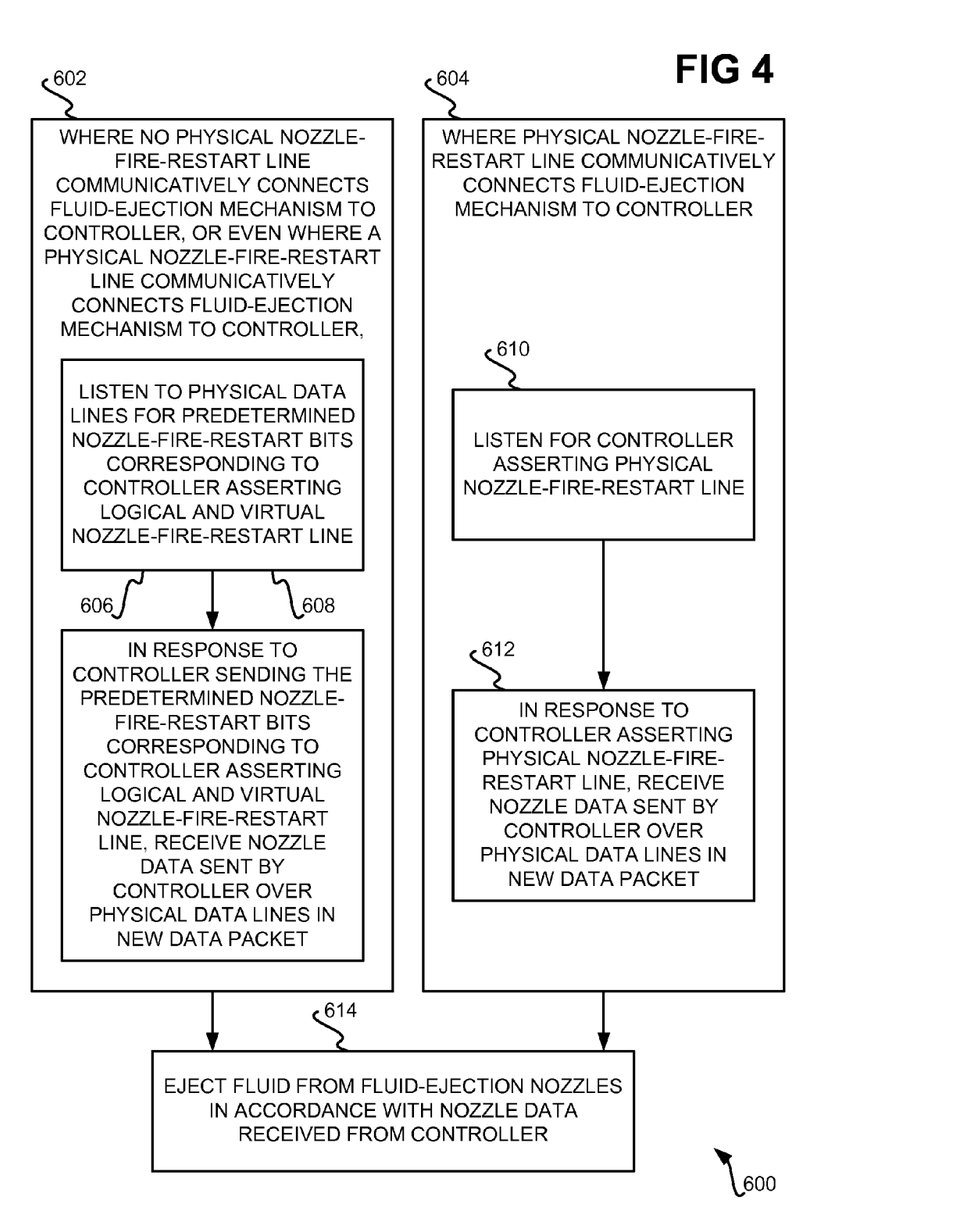
FIG. 4 is a flowchart of a method, according to an embodiment of the present disclosure.

FIG. 4 shows a method 600 that is performed by the fluid-ejection mechanism 204 of the fluid-ejection device 200, according to an embodiment of the present disclosure. The method 600 may be implemented as one or more computer programs stored on a computer-readable medium, such that the programs are executed by the fluid-ejection mechanism 204. For example, an ASIC of the fluid-ejection mechanism 204, or other logic hardware of the mechanism 204, may be programmed in accordance with these programs, where the computer-readable medium in such instance is the ASIC or other logic hardware.

In the method 600, part 602 may be performed, or part 604 may be performed. In the former case, where no physical nozzle-fire-restart line 304 connects the fluid-ejection mechanism 204 to the controller 202, or even where a physical nozzle-fire-restart line 304 connects the fluid-ejection mechanism 204 to the controller 202, the following is performed (602). The fluid-ejection mechanism 204 listens to the physical data lines 206 for the predetermined nozzle-fire-restart bits that correspond to the assertion of the logical and virtual nozzle-fire-restart line 208 by the controller 202 (606). For instance, the fluid-ejection mechanism 204 may receive data sub-packets of data packets over the physical data lines 206, and may detect that one such sub-packet includes the predetermined nozzle-fire-restart bits.

Such listening is effectively a condition to the fluid-ejection mechanism 204 discerning that the nozzle data is being sent for the fluid-ejection nozzles 402 in the predetermined sequence by the controller 202 over the physical data lines 206—that is, that the data sub-packet in which the predetermined nozzle-fire-restart bits have been included is the first data sub-packet of a new data packet. In response to the assertion of the logical and virtual nozzle-fire-restart line 208, as indirectly detected by the fluid-ejection mechanism 204 via the predetermined nozzle-fire-restart bits being transmitted over the physical data lines 206, the mechanism 204 receives the nozzle data for the fluid-ejection nozzles 402 in the predetermined sequence, as sent over the physical data lines 206 (608), such as in a new data packet. That is, the mechanism 204 receives the nozzle data for the fluid-ejection nozzles 402 within a new data packet, starting with the data sub-packet in which the predetermined nozzle-fire-restart bits have been detected.

In the latter case, where a physical nozzle-fire-restart line 304 connects the fluid-ejection mechanism 204 to the controller 202, the following is performed (604). The fluid-ejection mechanism 204 listens for the physical nozzle-fire-restart line 304 to be asserted by the controller 202 (610). In response to the assertion of the physical-data start line 304, as directly detected by the fluid-ejection mechanism 204, the mechanism 204 receives the nozzle data for the fluid-ejection nozzles 402 in the predetermined sequence, as sent over the physical data lines 206 (612), such as in a new data packet. That is, the mechanism 204 receives the nozzle data for the fluid-ejection nozzles 402 within a new data packet, starting with the data sub-packet that was received when the physical nozzle-fire-restart line 304 was asserted.

From either part 602 or part 604, the method 600 concludes by the fluid-ejection mechanism 204 ejecting fluid from the fluid-ejection nozzles 402 in the predetermined sequence in accordance with the nozzle data that was received from the controller 202 over the physical data lines 206 (614). In the method 600, it is noted that where there is no physical nozzle-fire-restart line 304 directly communicatively connecting the fluid-ejection mechanism 204 to the controller 202, then just the part 602 can be performed, and the part 604 cannot be performed. By comparison, where there is a physical nozzle-fire-restart line 304 directly communicatively connecting the fluid-ejection mechanism 204 to the controller 202, then either the part 602 can be performed, or the part 604 can be performed, depending on how the controller 202 and the mechanism 204 are programmed.

Figure 5A:
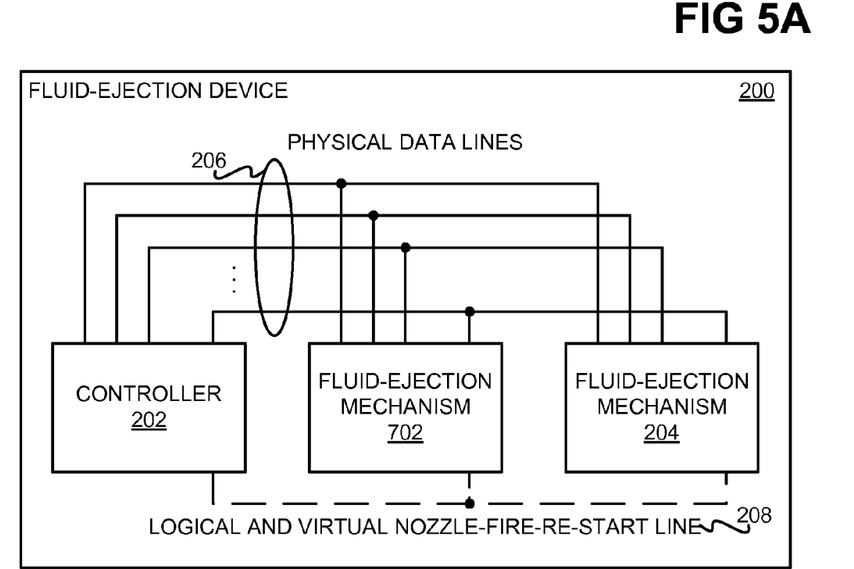
FIGS. 5A and 5B are diagrams of a fluid-ejection device having multiple fluid-ejection mechanisms, according to varying embodiments of the disclosure.
Figure 5B:
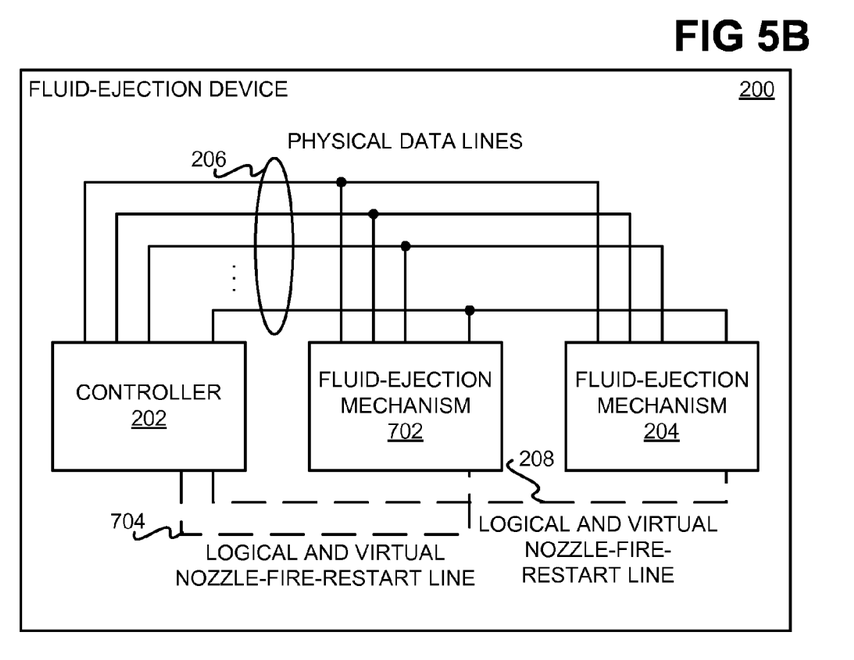

FIGS. 5A and 5B show the fluid-ejection device 200 in which there are two fluid-ejection mechanisms 204 and 702, according to varying embodiments of the present disclosure. FIGS. 5A and 5B typify embodiments in which there are multiple fluid-ejection mechanisms, as opposed to just one fluid-ejection mechanism as has been described heretofore in the detailed description. While FIGS. 5A and 5B are described in relation to particular scenarios in which there are two fluid-ejection mechanisms, the principles described in relation to these scenarios can be extended to other embodiments in which there are more than two fluid-ejection mechanisms.

In both FIGS. 5A and 5B, the fluid-ejection device 200 includes the two fluid-ejection mechanisms 204 and 702, as well as the controller 202, and the physical data lines 206 communicatively connecting the controller 202 to both the mechanisms 204 and 702. In FIG. 5A, the fluid-ejection mechanisms 204 and 702 share a single logical and virtual nozzle-fire-restart line 208. By comparison, in FIG. 5B, the fluid-ejection mechanism 204 has its own separate logical and virtual nozzle-fire-restart line 208, and the fluid-ejection mechanism 702 has its own separate logical and virtual nozzle-fire-restart line 704.

The fluid-ejection device 200 of the embodiment of FIG. 5A operates similarly to the fluid-ejection device 200 of the embodiments of FIGS. 1 and 2 as has been described above. Thus, when the controller 202 asserts the single logical and virtual nozzle-fire-restart line 208, the fluid-ejection mechanisms 204 and 702 listens to the physical data lines 206 for nozzle data in the predetermined sequence, starting with the first data sub-packet of a new data packet. The nozzle data may include address information to distinguish nozzle data intended for the fluid-ejection mechanism 204 as compared to nozzle data intended for the fluid-ejection mechanism 702. The former nozzle data may be referred to as first nozzle data, whereas the latter nozzle data may be referred to as second nozzle data.

In one embodiment, the controller 202 asserts the logical and virtual nozzle-fire-restart line 208 in FIG. 5A by transmitting one or more predetermined nozzle-fire-restart bits on the physical data lines 206. The fluid-ejection mechanisms 204 and 702 therefore listen to the physical data lines 206 for these predetermined nozzle-fire-restart bits as to discern that the nozzle data is being sent in the predetermined sequence starting with the first data sub-packet of a new data packet. Because there is just one logical and virtual nozzle-fire-restart line 208 shared by both the fluid-ejection mechanisms 204 and 702, the mechanism 204 listens for the same predetermined nozzle-fire-restart bits as the mechanism 702 does. As such, the fluid-ejection mechanisms 204 and 702 listen for their respective nozzle data (in the predetermined sequence) at essentially the same time, upon having detected the same predetermined nozzle-fire-restart bits transmitted by the controller 202 over the physical data lines 206.

By comparison, the fluid-ejection device 200 of the embodiment of FIG. 5B has separate logical and virtual nozzle-fire-restart lines 208 and 702 for the two fluid-ejection mechanisms 204 and 702, respectively. This means that the controller 202 can assert the logical and virtual nozzle-fire-restart line 208 at a different time than it asserts the logical and virtual nozzle-fire-restart line 704. Therefore, the nozzle data intended for the fluid-ejection mechanism 204 can be transmitted in the predetermined sequence asynchronously by the controller 202 as compared to the nozzle data intended for the fluid-ejection mechanism 702. It is noted in this respect that the fluid-ejection mechanism 204 has a predetermined sequence of its fluid-ejection nozzles, and the fluid-ejection mechanism 702 has a predetermined sequence of its fluid-ejection nozzles. Thus, there are effectively two predetermined sequences: a predetermined sequence of the fluid-ejection nozzles of the fluid-ejection mechanism 204, and a predetermined sequence of the fluid-ejection nozzles of the fluid-ejection mechanism 702.

In one embodiment, the controller 202 asserts the logical and virtual nozzle-fire-restart lines 208 and 704 by transmitting different predetermined nozzle-fire-restart bits, such as different patterns of nozzle-fire-restart bits, on the physical data lines 206. The predetermined nozzle-fire-restart bits corresponding to assertion of the logical and virtual nozzle-fire-restart line 208 may be referred to as first predetermined nozzle-fire-restart bits, whereas the predetermined nozzle-fire-restart bits corresponding to assertion of the logical and virtual nozzle-fire-restart line 704 may be referred to as second predetermined nozzle-fire-restart bits. The fluid-ejection mechanisms 204 and 702 therefore listen to the physical data lines 206 for different predetermined nozzle-fire-restart bits to discern that the nozzle data is beginning to be sent in the predetermined sequences of their fluid-ejection nozzles, in first data sub-packets of new data packets. As such, the fluid-ejection mechanisms 204 and 702 can receive their respective nozzle data starting with the first nozzle in the predetermined sequence in question at different times (i.e., the first data sub-packets of data packets can be received at different times), if their corresponding predetermined nozzle-fire-restart bits are transmitted by the controller 202 over the physical data lines 206 at different times.

Having different logical and virtual nozzle-fire-restart lines 208 and 704 for the fluid-ejection mechanisms 204 and 702 in FIG. 5B is advantageous, because it permits the mechanisms 204 and 702 to eject fluid in their corresponding predetermined sequences of fluid-ejection nozzles asynchronously with one another. For example, the controller 202 can first assert the logical and virtual nozzle-fire-restart line 208 to have the fluid-ejection mechanism 204 begin ejecting fluid from its fluid-ejection nozzles in its predetermined sequence, within a new data packet. At any point thereafter the controller 202 can then assert the logical and virtual nozzle-fire-restart line 704 to have the fluid-ejection mechanism 702 begin ejecting fluid from its fluid-ejection nozzles in its predetermined sequence, within a new data packet. By comparison, having a single logical and virtual nozzle-fire-restart line 208 shared by both the fluid-ejection mechanisms 204 and 702 does not permit the mechanisms 204 and 702 to eject fluid asynchronously with one another in their corresponding predetermined sequences of fluid-ejection nozzles. Rather, once the controller 202 asserts the logical and virtual nozzle-fire-restart line 208, both the fluid-ejection mechanisms 204 and 702 begin ejecting fluid synchronously with one another in FIG. 5A, from their fluid-ejection nozzles in their corresponding predetermined sequences.

Asynchronous fluid ejection by the fluid-ejection mechanisms 204 and 702 can effectively double the printing resolution as compared to synchronous fluid ejection by the mechanisms 204 and 702 and as compared to fluid ejection by just one of the mechanisms 204 and 702. For example, synchronous fluid ejection by both the fluid-ejection mechanisms 204 and 702, or fluid ejection by just one of the mechanisms 204 and 702, may provide for a printing resolution of X dots per inch (dpi), where the single logical and virtual nozzle-fire-restart line 208 is asserted every period T. By comparison, asynchronous fluid ejection by the fluid-ejection mechanisms 204 and 702, where the logical and virtual data start lines 208 and 704 are asserted at identical periods T but that are 180 degrees out of phase with one another, can provide for a printing resolution of 2X dpi.

In general, then, where there are M>1 fluid-ejection mechanisms and M>1 logical and virtual data start lines, assertion of these fluid-ejection mechanisms at identical periods T but that are out of phase with one another by 360/M can provide for a printing resolution of MX dpi. It is noted that having adding extra logical and virtual nozzle-fire-restart lines is relatively easily accomplished, since these nozzle-fire-restart lines are not actual physical lines, but rather correspond to different predetermined nozzle-fire-restart bits asserted on the physical data lines 206. Where the number of nozzle-fire-restart bits is N, up to $2^N$ different logical and virtual nozzle-fire-restart lines can be encoded by unique patterns of these nozzle-fire-restart bits. For example, where there are two nozzle-fire-restart bits, there are four different patterns: 00, 01, 10, and 11, where each of these patterns can correspond to a different logical and virtual nozzle-fire-restart line.

We claim:

1. A fluid-ejection device comprising:
   a plurality of physical data lines;
   a controller communicatively connected to the physical data lines and to assert a logical and virtual nozzle-fire-restart line to denote that a first data sub-packet of a new data packet of nozzle data for a predetermined sequence of a plurality of fluid-ejection nozzles has been transmitted over the physical data lines; and,
   a fluid-ejection mechanism including the plurality of fluid-ejection nozzles, the fluid-ejection mechanism communicatively connected to the physical data lines and to listen for the controller to assert the logical and virtual nozzle-fire-restart line to discern that the first data sub-packet of the new data packet has been transmitted over the physical data lines.

2. The fluid-ejection device of claim 1, wherein the controller is transmit one or more predetermined nozzle-fire-restart bits corresponding to assertion the logical and virtual nozzle-fire-restart line,
   and wherein the fluid-ejection mechanism is to listen to the physical data lines for the predetermined nozzle-fire-restart bits corresponding to assertion of the logical and virtual nozzle-fire-restart line by the controller.

3. The fluid-ejection device of claim 2, wherein controller is to transmit the predetermined nozzle-fire-restart bits corresponding to assertion of the logical and virtual nozzle-fire-restart line in lieu of asserting a physical nozzle-fire-restart line communicatively connecting the controller and the fluid-ejection mechanism.

4. The fluid-ejection device of claim 2, further comprising the physical nozzle-fire-restart line communicatively connecting the controller and the fluid-ejection mechanism.

5. The fluid-ejection device of claim 2, wherein no physical nozzle-fire-restart line communicatively connects the controller and the fluid-ejection mechanism.

6. The fluid-ejection device of claim 2, wherein the fluid-ejection mechanism is a first fluid-ejection mechanism, the predetermined sequence is a first predetermined sequence, and the nozzle data is first nozzle data for the first fluid-ejection mechanism,
   wherein the fluid-ejection device further comprises a second fluid-ejection mechanism communicatively connected to the physical data lines, and the controller is to transmit second nozzle data over the physical data lines for the second fluid-ejection mechanism in a second predetermined sequence of a plurality of fluid-ejection nozzles of the second fluid-ejection mechanism.

7. The fluid-ejection device of claim 6, wherein the second fluid-ejection mechanism is to listen to the physical data lines for the predetermined nozzle-fire-restart bits corresponding to the controller asserting the logical and virtual nozzle-fire-restart line,
   and wherein the predetermined nozzle-fire-restart bits that the second fluid-ejection mechanism is to listen to the physical data lines for are identical to the predetermined nozzle-fire-restart bits that the first fluid-ejection mechanism is to listen to the physical data lines for, such that the logical and virtual nozzle-fire-restart line is asserted by the controller for both the first fluid-ejection mechanism and the second fluid-ejection mechanism.

8. The fluid-ejection device of claim 6, wherein the predetermined nozzle-fire-restart bits are first predetermined nozzle-fire-restart bits for the first fluid-ejection mechanism and the logical and virtual nozzle-fire-restart line is a first logical and virtual nozzle-fire-restart line for the first fluid-ejection mechanism,
   wherein the second fluid-ejection mechanism is to listen to the physical data lines for one or more second predetermined nozzle-fire-restart bits corresponding to the controller asserting a second logical and virtual nozzle-fire-restart line,
   and wherein the first predetermined nozzle-fire-restart bits are different than the second predetermined nozzle-fire-restart bits, such that the first logical and virtual nozzle-fire-restart line is asserted by the controller for the first fluid-ejection mechanism and the second logical and virtual nozzle-fire-restart line is asserted by the controller for the second fluid-ejection mechanism.

9. The fluid-ejection device of claim 1, wherein the nozzle data controls how fluid is ejected by the fluid-ejection mechanism via the fluid-ejection nozzles of the fluid-ejection mechanism.

10. The fluid-ejection device of claim 1, wherein the nozzle data corresponds to at least a portion of an image to be formed on a medium resulting from fluid ejected by the fluid-ejection mechanism onto the medium.

11. A method for performance by a fluid-ejection mechanism of a fluid-ejection device, comprising:
    listening for assertion of a logical and virtual nozzle-fire-restart line asserted by a controller communicatively connected to the fluid-ejection, to discern that a first data sub-packet of a new data packet of nozzle data for a predetermined sequence of a plurality of fluid-ejection nozzles of the fluid-ejection mechanism has been transmitted by the controller to the fluid-ejection mechanism over the physical data lines;
    upon the controller asserting the logical and virtual nozzle-fire-restart line, receiving the nozzle data sent by the controller in the predetermined sequence over the physical data lines; and,
    ejecting fluid from a plurality of fluid-ejection nozzles of the fluid-ejection mechanism in accordance with the nozzle data received from the controller.

12. The method of claim 11, wherein listening for assertion of the logical and virtual nozzle-fire-restart line comprises listening to the physical data lines for one or more predetermined nozzle-fire-restart bits corresponding to the controller of the fluid-ejection device asserting the logical and virtual nozzle-fire-restart line.

13. The method of claim 11, wherein the method is performed where no physical nozzle-fire-restart line communicatively connects the fluid-ejection mechanism to the controller.

14. The method of claim 11, further comprising:
    where a physical nozzle-fire-restart line communicatively connects the fluid-ejection mechanism to the controller, listening for the controller to assert the physical nozzle-fire-restart line to discern that the first data sub-packet of the new data packet of the nozzle data for the predetermined sequence of the fluid-ejection nozzles has been transmitted over the physical data lines by the controller; and, upon the controller asserting the physical nozzle-fire-restart line, receiving the nozzle data sent by the controller in the predetermined sequence over the physical data lines.

15. A computer-readable medium having one or more computer programs that are executable by a fluid-ejection mechanism of a fluid-ejection device for the fluid-ejection mechanism to perform a method comprising:

where a physical nozzle-fire-restart line communicatively connects the fluid-ejection mechanism to a controller of the fluid-ejection device, listening for the controller to assert the physical nozzle-fire-restart line before beginning to discern that a first data sub-packet of a new data packet of nozzle data for a predetermined sequence of a plurality of fluid-ejection nozzles of the fluid-ejection mechanism has been transmitted by the controller to the fluid-ejection mechanism over a plurality of physical data lines communicatively connecting the fluid-ejection mechanism to the controller; and, upon the controller asserting the physical nozzle-fire-restart line, receiving the nozzle data sent by the controller in the predetermined sequence over the physical data lines;

where no physical nozzle-fire-restart line communicatively connects the fluid-ejection mechanism to the controller, listening for the controller to assert a logical and virtual nozzle-fire-restart line, to discern that the first data sub-packet of the new data packet of the nozzle data for the predetermined sequence of the fluid-ejection nozzles has been transmitted over the physical data lines;

upon the controller asserting the logical and virtual nozzle-fire-restart line, receiving the nozzle data sent by the controller in the predetermined sequence over the physical data lines; and, ejecting fluid from a plurality of fluid-ejection nozzles of the fluid-ejection mechanism in accordance with the nozzle data received from the controller.

* * * * *